Feb. 24, 1931.  H. C. PRINCE ET AL  1,794,319
BELT CLAMP
Filed Aug. 13, 1930
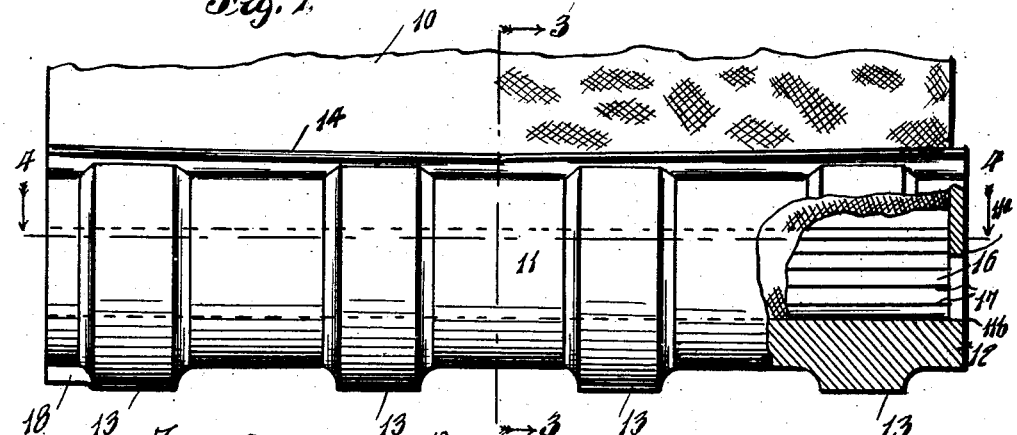
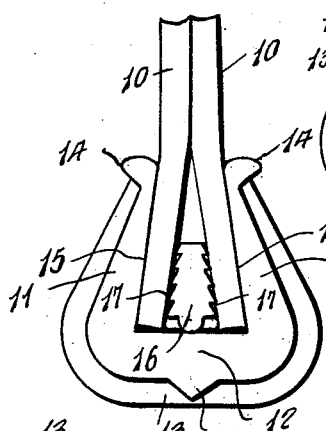
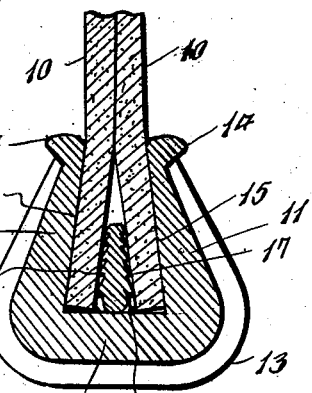
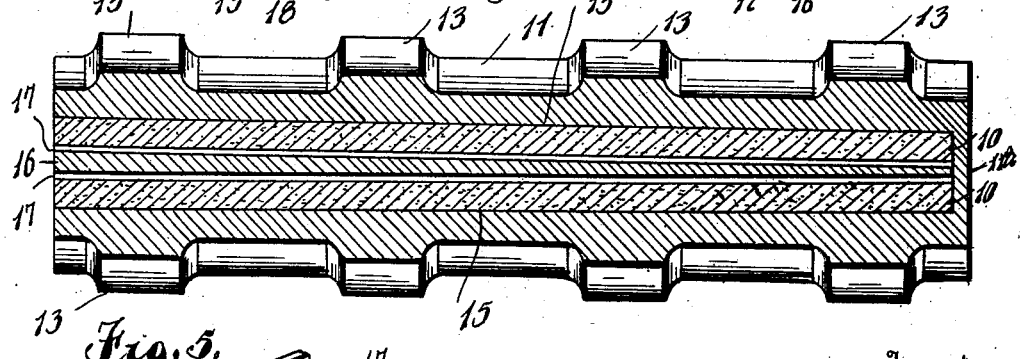
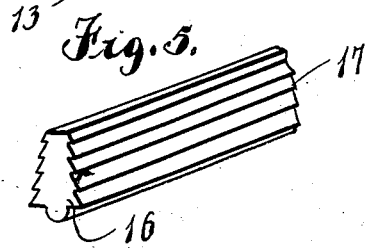
Inventors
C. J. Kennedy, H. C. Prince Patented Feb. 24, 1931

1,794,319

UNITED STATES PATENT OFFICE

HUBBARD C. PRINCE AND CLYDE J. KENNEDY, OF AMARILLO, TEXAS

BELT CLAMP

Application filed August 13, 1930. Serial No. 475,053.

This invention relates to a belt clamp of the general type disclosed in Letters Patent granted to us on May 19, 1925, No. 1,538,705 and it aims to provide a generally improved and more efficient construction of means whereby the ends of a drive belt or the like may be wedged in place against danger of slippage.

The more specific objects and advantages will become apparent from a consideration of the description following taken in connection with accompanying drawings illustrating an operative embodiment.

In said drawings:—

Figure 1 is a side elevation, partly broken away, showing the invention as applied to belt ends, Figure 2 is an end elevation of the parts of Figure 1, Figure 3 is a cross sectional view taken on the line 3—3 of Figure 1, Figure 4 is a longitudinal sectional view taken on the line 4—4 of Figure 1, Figure 5 is a perspective view of the slip employed, and Figure 6 is a view of the end opposite to the end shown in Figure 2.

Referring specifically to the drawings, the ends of a belt to be connected are suggested at 10.

The clamp comprises a channel shape body 11 of suitable size and material, for instance being of aluminum. The wall of such body from the free ends gradually increases in thickness so as to be thickest at the base as at 12. At suitable intervals along the length of the body, it is preferably reenforced with ribs 13 integral therewith, which also gradually increase in thickness from the free edges of the body to the portions 13 which surround said base 12. Flanges 14 preferably extend outwardly from the body 11 at the aforesaid free edges.

The channel of the body 11 is designated 15 and the side walls thereof taper from one end toward the other, for instance from the left hand end of Figure 4 to the right hand end thereof, the upper portion of the channel 15 being closed by a cross member 11ª.

Coacting with the channel member is a one- piece slip or wedge 16 whose side walls converge toward each other as shown in Figure 4, in conformity with the taper of the side walls of the channel 15. By providing the cross member 11ª means are provided to insure proper insertion of the wedge 16. Furthermore by having the cross member across the upper portion of the channel 15, only, an opening 11ᵇ is provided giving access to the channel to insert a suitable implement to push the wedge 16 outwardly in releasing the ends of belt 10.

On each side wall of the slip 16 it is provided with belt-engaging ridges 17 which are adapted to bite or engage the ends 10 to securely hold the same in place.

Formed on the body 11 are suitable indications 18 to show the direction in which the slip 16 is to be inserted.

In use, the ends 10 are inserted into the channel 15 after which the slip 16 is driven into the channel from the left hand end which tightly engages and binds such ends 10 in place. Such ends 10 are disposed at an angle as shown and as such ends 10 are bent away from each other, the portions thereof within the channel member tend to bulge and those elements 17 spaced from the lower extremities of the ends 10 especially firmly bite into and engage the ends 10 and prevent displacement thereof.

Various changes may be resorted to provided they fall within the spirit and scope of the invention.

We claim as our invention:—

1. A belt clamp consisting of a channelled body having its channel of dove-tail shape and one end wider than the other, and a wedge disposed in the channel adapted to bind the ends of a belt against the side walls of the channel.

2. A belt clamp consisting of a channelled body having its channel of dove-tail shape and one end wider than the other, a wedge disposed in the channel adapted to bind the ends of a belt against the side walls of the channel, said wedge having ridges thereon to engage the belt ends.

3. A belt clamp consisting of a channelled body having its channel of dove-tail shape and one end wider than the other, a wedge disposed in the channel adapted to bind the ends of a belt against the side walls of the channel, and spaced apart reenforcing members disposed substantially transversely of the body and integral therewith.

4. A belt clamp consisting of a channelled body having its channel of dove-tail shape and one end wider than the other, a wedge disposed in the channel adapted to bind the ends of a belt against the side walls of the channel, spaced apart reenforcing members disposed substantially transversely of the body and integral therewith, said body being provided with reinforcing ribs increasing in thickness inwardly from the free edges of the body and said body having outwardly extending flanges at said free edges.

5. A belt clamp, comprising a channelled body and having the channel therein of dovetail shape and narrower at one end than the other, a cross member closing the upper portion of the channel at the narrower end thereof, and a wedge disposed in the channel and adapted to bind the ends of a belt against the side walls of the channel.

6. A belt clamp, comprising a channelled body and having the channel therein of dovetail shape and narrower at one end than the other, a cross member closing the upper portion of the channel at the narrower end thereof and providing an opening communicating with the lower portion of the channel, and a wedge disposed in the channel and adapted to bind the ends of a belt against the side walls of the channel.

In testimony whereof we affix our signatures.

HUBBARD C. PRINCE.
CLYDE J. KENNEDY.